US009346716B2

(12) United States Patent
Okamura et al.

(10) Patent No.: US 9,346,716 B2
(45) Date of Patent: May 24, 2016

(54) TOOL MADE OF CUBIC BORON NITRIDE SINTERED BODY

(75) Inventors: Katsumi Okamura, Itami (JP); Makoto Setoyama, Itami (JP); Satoru Kukino, Itami (JP)

(73) Assignee: Sumitomo Electric Hardmetal Corp., Itami-shi (JP)

( * ) Notice: Subject to any disclaimer, the term of this patent is extended or adjusted under 35 U.S.C. 154(b) by 229 days.

(21) Appl. No.: 13/634,222

(22) PCT Filed: Oct. 29, 2010

(86) PCT No.: PCT/JP2010/069337
§ 371 (c)(1),
(2), (4) Date: Sep. 11, 2012

(87) PCT Pub. No.: WO2011/111261
PCT Pub. Date: Sep. 15, 2011

(65) Prior Publication Data
US 2013/0000213 A1    Jan. 3, 2013

(30) Foreign Application Priority Data

Mar. 12, 2010  (JP) ................................. 2010-055326

(51) Int. Cl.

| | |
|---|---|
| *C04B 35/5831* | (2006.01) |
| *C04B 35/628* | (2006.01) |
| *C04B 35/626* | (2006.01) |
| *C04B 35/64* | (2006.01) |
| *C22C 26/00* | (2006.01) |
| *B24D 3/06* | (2006.01) |

(52) U.S. Cl.
CPC ......... *C04B 35/5831* (2013.01); *C04B 35/6262* (2013.01); *C04B 35/62842* (2013.01); *C04B 35/62884* (2013.01); *C04B 35/62897* (2013.01); *C04B 35/64* (2013.01); *C22C 26/00* (2013.01); *C04B 2235/326* (2013.01); *C04B 2235/3231* (2013.01); *C04B 2235/3232* (2013.01); *C04B 2235/3244* (2013.01); *C04B 2235/3256* (2013.01); *C04B 2235/3258* (2013.01); *C04B 2235/3268* (2013.01); *C04B 2235/3279* (2013.01); *C04B 2235/3409* (2013.01); *C04B 2235/3418* (2013.01); *C04B 2235/3804* (2013.01); *C04B 2235/3813* (2013.01); *C04B 2235/3817* (2013.01); *C04B 2235/3839* (2013.01); *C04B 2235/3843* (2013.01); *C04B 2235/3847* (2013.01); *C04B 2235/3865* (2013.01); *C04B 2235/3873* (2013.01); *C04B 2235/3886* (2013.01); *C04B 2235/402* (2013.01); *C04B 2235/404* (2013.01); *C04B 2235/405* (2013.01); *C04B 2235/428* (2013.01); *C04B 2235/5436* (2013.01); *C04B 2235/5445* (2013.01); *C04B 2235/6567* (2013.01); *C04B 2235/666* (2013.01); *C04B 2235/80* (2013.01); *C04B 2235/85* (2013.01); *C04B 2235/963* (2013.01); *C04B 2235/9607* (2013.01); *C22C 2026/003* (2013.01)

(58) Field of Classification Search
CPC ........ B24D 3/00; B24D 18/00; C09K 3/1409; C09K 3/1463
USPC .......................................................... 51/307
See application file for complete search history.

(56) References Cited

U.S. PATENT DOCUMENTS

| | | | | |
|---|---|---|---|---|
| 4,693,746 A | * | 9/1987 | Nakai et al. ...................... 75/238 |
| 5,536,485 A | * | 7/1996 | Kume et al. .................. 423/446 |
| 5,976,707 A | * | 11/1999 | Grab ............................. 428/547 |
| 6,265,337 B1 | * | 7/2001 | Kukino et al. ............... 501/96.4 |
| 6,316,094 B1 | | 11/2001 | Fukaya et al. | |
| 2005/0143252 A1 | | 6/2005 | Okamura et al. | |
| 2008/0302023 A1 | * | 12/2008 | Goudemond et al. .......... 51/309 |
| 2009/0169840 A1 | | 7/2009 | Okamura et al. | |
| 2010/0099548 A1 | * | 4/2010 | Okamura ............... B82Y 30/00 501/87 |

FOREIGN PATENT DOCUMENTS

| | | |
|---|---|---|
| CN | 1242350 A | 1/2000 |
| CN | 101466651 A | 6/2009 |
| CN | 100537809 C | 9/2009 |
| EP | 1378497 A1 * | 1/2004 |
| EP | 1 905 751 A1 | 4/2008 |
| EP | 1 932 816 A1 | 6/2008 |

(Continued)

OTHER PUBLICATIONS

Wikipedia "Solid Solution" Accessed Aug. 3, 2015.*

(Continued)

*Primary Examiner* — Pegah Parvini
*Assistant Examiner* — Alexandra M Moore
(74) *Attorney, Agent, or Firm* — Venable LLP; Michael A. Sartori; F. Brock Riggs

(57) ABSTRACT

A tool made of a cubic boron nitride sintered body which has a long life in a stable manner in any application of cutting and plastic working is provided. The tool made of the cubic boron nitride sintered body according to the present invention includes a cubic boron nitride sintered body at least at a tool working point and it is characterized by satisfying an Equation (I) and any one of an Equation (II) and an Equation (III)

$$20 \leq X \leq 98 \quad \text{(I)}$$

$$Y \leq 0.6 \times X + 3 \text{ (where } 20 \leq X < 88\text{)} \quad \text{(II)}$$

$$Y \leq 5.8 \times X - 455 \text{ (where } 88 \leq X \leq 98\text{)} \quad \text{(III)}$$

where a ratio of cubic boron nitride contained in the cubic boron nitride sintered body is denoted as X volume % and thermal conductivity of the cubic boron nitride sintered body is denoted as Y (W/m·K).

8 Claims, No Drawings

(56) References Cited

FOREIGN PATENT DOCUMENTS

| | | |
|---|---|---|
| EP | 1 950 189 A1 | 7/2008 |
| JP | 7-291732 A | 11/1995 |
| JP | 10-158065 A | 6/1998 |
| JP | 2005-187260 A | 7/2005 |
| JP | 2008-208028 A | 9/2008 |
| JP | 2008-222485 A | 9/2008 |
| JP | 2009-045715 A | 3/2009 |
| JP | 2009-067637 A | 4/2009 |
| WO | WO-2005/066381 A1 | 7/2005 |
| WO | WO-2007/145071 A1 | 12/2007 |
| WO | WO 2008093577 A1 * | 8/2008 ............. B82Y 30/00 |
| WO | WO-2009/150601 A1 | 12/2009 |

OTHER PUBLICATIONS

W.Y.H. Liew et al., "Wear characteristics of PCBN tools in the ultra-precision machining of stainless steel at low speeds," vol. 254, No. 3-4, Feb. 2003, pp. 265-277.

Extended European Search Report in European Patent Application No. 10847488.3, dated Oct. 17, 2013.

Kukino, "cBN Shoketsutai Kogu ni yoru Jidosha Buhin no Kako Jirei," Kikai Gijutsu, vol. 54, No. 4, pp. 29-34 (2006).

Office Action in Chinese Patent Application No. 201080065353.X, dated Jun. 4, 2014.

* cited by examiner

TOOL MADE OF CUBIC BORON NITRIDE SINTERED BODY

TECHNICAL FIELD

The present invention relates to a tool made of a cubic boron nitride sintered body and particularly to a tool made of a cubic boron nitride sintered body excellent in wear resistance and chipping resistance.

BACKGROUND ART

In cutting a material, a cutting tool and a cutting method suitable for a work material are selected. With regard to achieving a long life during cutting, how a temperature at a cutting edge is suppressed during cutting is important, and a tool material having excellent thermal conductivity is valued. In general, also during cutting using a tool made of an ultra-high pressure sintered body such as a diamond sintered body and a cubic boron nitride (which may also be denoted as "cBN") sintered body excellent in thermal conductivity, diffusion into a work material or chemical wear such as oxidation develops due to increase in temperature at the cutting edge under such a high-efficiency condition as a high-speed condition or a large cutting-depth or high-feed condition. As measures for suppressing such wear, change to a low-speed condition, suppression of resistance during cutting by decreasing a wedge angle at the cutting edge of the tool, cooling of a cutting point by injecting a coolant toward the cutting point, or the like has been carried out.

For example, as measures for achieving a further longer life during cutting of a difficult-to-machine material, Japanese Patent Laying-Open No. 2009-045715 (PTL 1) uses a cutting tool, in which an ultra-high pressure sintered body material having such a high heat radiation property as thermal conductivity not lower than 100 W/m·K is applied to a portion of a cutting edge at least involved with cutting. Then, this publication discloses an invention for suppressing increase in temperature at a cutting edge due to heat generated by cutting, by carrying out working while the cutting edge of such a cutting tool is cooled with a high-pressure coolant.

Meanwhile, for example, during cutting of a brittle difficult-to-machine material such as glass, ceramics, cemented carbide, or an iron-based sintered alloy difficult-to-machine material, it has been proposed to achieve a good worked surface by softening a work material or varying a mechanism of generation of chips from a brittleness mode to a ductility mode by carrying out cutting under a high-speed condition or by increasing a temperature at a point of cutting of the work material with laser assistance.

In principle, however, the cutting edge of the tool is exposed to a high temperature and also to rapid cooling, and hence a cutting tool tends to degrade and chipping or sudden chipping thereof is likely. In addition, in a machine tool as well, such problems as restriction on the number of revolutions of a main shaft or requirement for installation of an expensive laser apparatus arise.

A cBN sintered body mainly refers to a body obtained by bonding cBN particles to one another with a binder phase mainly composed of TiN, TiC, Co, and Al. The cBN particles are a material having hardness and thermal conductivity next to diamond and being superior in toughness to a ceramics material. Therefore, a cBN sintered body having such a high cBN content that it contains cBN particles by 80 volume % or more is excellent in such characteristics as resistance to plastic deformation, chipping resistance, and the like.

A tool made of a cBN sintered body, which includes the cBN sintered body having such characteristics, is excellent in that it is better in chemical stability, lower in affinity with iron, longer in life, and higher in efficiency in working because of its high hardness as a material, than a tool material such as a conventional superhard tool and the like, and it is highly evaluated. Such a tool made of a cBN sintered body of high performance has replaced a conventionally used tool in such applications as cutting of Ni-based and iron-based high-hardness difficult-to-machine materials, applications of plastic working of a punching tool for cold forging, and the like.

Here, cutting refers to machining of an article having desired dimension and shape while a work material is locally sheared and crushed and chips are generated. On the other hand, plastic working refers to application of force to a workpiece to deform the same and formation of the workpiece into a product having prescribed shape and dimension. It is noted that plastic working is different from cutting in that no chips are generated.

Since the tool made of the cBN sintered body has excellent characteristics as described above, it is advantageous in that sudden chipping is less likely in any application of cutting and plastic working and it is extremely suitably employed.

For example, with regard to a conventional tool made of a cBN sintered body, Japanese Patent Laying-Open No. 07-291732 (PTL 2) and Japanese Patent Laying-Open No. 10-158065 (PTL 3) regard such a metal as Al, oxygen, and the like contained in a cBN sintered body as an impurity. Then, these publications each disclose a technique for improving hardness and toughness of a cBN sintered body by minimizing introduction of such an impurity and increasing a ratio of cBN particles to be mixed.

In addition, a tool made of a cBN sintered body has been considered and commonly believed to be high in performance if it has high hardness and high toughness as well as high thermal conductivity. In accordance with this common belief, Japanese Patent Laying-Open No. 2005-187260 (PTL 4) and WO2005/066381 (PTL 5) each have proposed use of a cBN sintered body containing high-purity cBN particles at high concentration by making use of high thermal conductivity of high-purity cBN particles. Thus, a tool made of a cBN sintered body which achieves improved hardness and toughness as well as improved thermal conductivity can be obtained. Chipping of such a tool made of a cBN sintered body is less likely even in a case of plastic working of a material of low ductility, in particular in a case of cutting of an iron-based sintered alloy, and the tool is excellent also in wear resistance, whereby the tool is suitably used.

CITATION LIST

Patent Literature

PTL 1: Japanese Patent Laying-Open No. 2009-045715
PTL 2: Japanese Patent Laying-Open No. 07-291732
PTL 3: Japanese Patent Laying-Open No. 10-158065
PTL 4: Japanese Patent Laying-Open No. 2005-187260
PTL 5: WO2005/066381

SUMMARY OF INVENTION

Technical Problem

In a case where a tool made of a cBN sintered body high in cBN content is applied to cutting of a difficult-to-machine material having low ductility characteristics, friction heat generated in a worked portion during cutting diffuses into the cBN sintered body because the cBN sintered body has high thermal conductivity. Consequently, cutting cannot proceed while a high temperature is maintained and hence cutting efficiency becomes significantly poor.

Namely, a sintered body high in cBN content in which a cBN sintered body component occupies 80 volume % or more is excellent in chipping resistance. At the same time, however, such a sintered body has high thermal conductivity, and hence friction heat generated through working escapes from the cBN sintered body. Therefore, since the work material does not soften due to insufficient conduction of heat generated during working to the work material, load is imposed on the tool, and even the tool made of the cBN sintered body high in chipping resistance is chipped.

In particular during cutting of an iron-based sintered alloy, because of its low ductility, in a cutting environment where a temperature of a work material is insufficient, shear does not smoothly proceed, pits are created in a worked surface, and surface roughness may become poor. When a cutting speed is increased in order to improve surface roughness, that is, a temperature of the work material is raised, wear rapidly develops and a satisfactory tool life cannot be obtained. Alternatively, in a case of shear-cutting of an ultra-heat-resistant alloy represented by an Ni-base excellent in hardness at a high temperature or also in a case where corresponding heat generated by working flows into a work material, a work material is less likely to soften because of its characteristics of excellent hardness at a high temperature and hence the cBN sintered body is likely to be chipped.

It is estimated that a main factor for such chipping caused in a cBN sintered body would be a mechanism of mechanical damage such as crush of cBN particles themselves due to insufficient strength or conspired falling-off of cBN particles due to insufficient binding force among the cBN particles.

A tool made of a cBN sintered body is required to have higher performance in plastic working, as well. Namely, in plastic working, with higher performance of a workpiece, working with cold forging in a case of plastic working of a difficult-to-work material having such characteristics as high hardness and low ductility is likely to cause such defects as cracks or fractures in the workpiece. Thus, only after hardness of the workpiece is lowered and ductility thereof is enhanced by heating the workpiece to a temperature not lower than 400° C. and not higher than 1000° C. as in warm forging, hot forging, and the like, the workpiece should be subjected to plastic working. In a case of plastic working with warm forging, hot forging, or the like, however, a temperature of a worked portion becomes higher by friction heat generated at the worked portion than in a case of working with cold forging, load is imposed on the tool by the influence from the high temperature, and consequently a life of the tool has extremely been short.

In addition, plastic working of a steel material containing carbon in an amount not less than 0.5 mass % will generate a brittle layer having a martensite structure or retained austenite, because a cBN sintered body has high thermal conductivity, heat generated by working rapidly flows out to a tool made of the cBN sintered body, and a workpiece is rapidly cooled. Material strength and fatigue strength of the workpiece thus also tend to degrade.

If a cBN content is less than 80 volume % in order to prevent rapid cooling of a workpiece, thermal conductivity becomes relatively low and heat generated by working is less likely to flow out to the tool made of the cBN sintered body and hence rapid cooling of the workpiece can be suppressed. On the other hand, a binder phase poorer in strength and toughness than cBN particles becomes relatively dominant, and hence the tool made of the cBN sintered body may be chipped in an early stage.

With such an approach to increase and decrease a content of cBN particles, improvement in hardness of a tool and lowering in thermal conductivity of the tool have trade-off relation, and it has been difficult to satisfy both of them.

The present invention was made in view of the circumstances as above, and an object thereof is to provide a tool made of a cubic boron nitride sintered body which is capable of maintaining hardness of a cubic boron nitride sintered body significantly higher than hardness of a work material during cutting and thus realizing a long life in a stable manner in any application of cutting and plastic working above by achieving both of thermal conductivity of the cubic boron nitride sintered body maintained low and improvement in hardness of the tool.

Solution to Problem

The present inventors have clarified characteristics required in applications of cutting and plastic working described above and have developed materials. Consequently, the present inventors have found that, by containing a cBN component by not less than 20 volume % and not more than 98 volume % at the time of fabrication of a cBN sintered body and by adding ultra-fine powders of an intermetallic compound of Al, Si, Ti, Zr, Ni, Mo, Cr, or the like to a component of a binder phase, a compound composed of one or more types of element selected from the group consisting of Al, Si, Ti, Zr, Ni, Mo, and Cr and one or more types of element selected from the group consisting of N, C, O, and B, which has an average particle size smaller than 100 nm, can be a heat insulating phase for lowering thermal conductivity. Further, a coating layer forms an intermetallic compound with N, C, O, and B during sintering, in such a manner that a cBN particle excellent in thermal conductivity is coated with a coating layer composed of a metal component and having an average film thickness smaller than 100 nm and then the cBN particles are mixed with a binder phase component. The present inventors have found that this intermetallic compound plays a role to prevent heat conduction and to effectively lower thermal conductivity of the cBN sintered body.

In addition, since each component of an ultra-fine compound above is poor in sinterability, unsintered regions scatter in a part of a cBN sintered body during ultra-high pressure sintering. Consequently, it was found that thermal conductivity of the cBN sintered body can be lowered and the present inventors have conducted further dedicated studies based on such findings. Thus, the present inventors have found relation between thermal conductivity and a ratio of cBN drastically improving cutting performance, and finally completed the tool made of the cBN sintered body according to the present invention.

Namely, a tool made of a cubic boron nitride sintered body according to the present invention includes a cubic boron nitride sintered body at least at a tool working point, and it is characterized by satisfying an Equation (I) and any one of an Equation (II) and an Equation (III) PS $$20 \leq X \leq 98 \tag{I}$$

$$Y \leq 0.6 \times X + 3 \text{ (where } 20 \leq X < 88) \tag{II}$$

$$Y \leq 5.8 \times X - 455 \text{ (where } 88 \leq X \leq 98) \tag{III}$$

where a ratio of cubic boron nitride contained in the cubic boron nitride sintered body is denoted as X volume % and thermal conductivity of the cubic boron nitride sintered body is denoted as Y (W/m·K).

A tool made of a cubic boron nitride sintered body according to the present invention includes a cubic boron nitride sintered body at least at a tool working point, and it is characterized by satisfying an Equation (II')

$$Y \leq 0.5 \times X + 1 \text{ (where } 60 \leq X < 88) \tag{II'}$$

where a ratio of cubic boron nitride contained in the cubic boron nitride sintered body is denoted as X volume % and thermal conductivity of the cubic boron nitride sintered body is denoted as Y (W/m·K).

In addition, preferably, the cubic boron nitride sintered body contains a heat insulating phase and a binder phase in addition to cubic boron nitride, the heat insulating phase contains one or more types of first compound composed of one or more types of element selected from the group consisting of Al, Si, Ti, Zr, Mo, Ni, and Cr and one or more types of element selected from the group consisting of N, C, O, and B, and the first compound is contained in the cubic boron nitride sintered body by not less than 1 mass % and not more than 20 mass % and it has an average particle size smaller than 100 nm. The first compound above preferably has an average particle size smaller than 50 nm. In addition, preferably, the heat insulating phase contains as its part, an unsintered region by not less than 0.01 volume % and not more than 3 volume %.

Further preferably, the first compound is a compound in which a solid solution of any one or both of oxygen and boron is present by not less than 0.1 mass % and not more than 10 mass % with respect to a nitride, a carbide, and a carbonitride of one or more types of element selected from the group consisting of Al, Si, Ti, Zr, Mo, Ni, and Cr.

Preferably, the heat insulating phase contains one or more types of second compound composed of W and/or Re and one or more types of element selected from the group consisting of N, C, O, and B, in addition to the first compound, and the second compound is contained in the cubic boron nitride sintered body by not less than 0.1 mass % and not more than 2 mass %.

Preferably, cubic boron nitride is composed of cubic boron nitride particles having an average particle size not greater than 1 μm, and preferably the cubic boron nitride particle has a surface coated with a coating layer and the coating layer has an average layer thickness not smaller than 5 nm and not greater than 50 nm.

Advantageous Effects of Invention

By having the features above, a tool made of a cubic boron nitride sintered body according to the present invention can achieve both of thermal conductivity of the cubic boron nitride sintered body maintained low and improvement in hardness of the tool. Thus, a tool made of a cubic boron nitride sintered body having a long life in a stable manner in any application of cutting and plastic working above can be provided.

DESCRIPTION OF EMBODIMENTS

Each feature of a tool made of a cubic boron nitride sintered body according to the present invention will be described further below.

<Tool Made of Cubic Boron Nitride Sintered Body>

A tool made of a cubic boron nitride sintered body according to the present invention has a construction including a cBN sintered body at least at a tool working point. Specifically, the tool made of the cBN sintered body according to the present invention may have such a construction that the cBN sintered body is fixed to a tool shank portion with a vibration-isolating heat-resistant plate being interposed or the cBN sintered body is fixed to a base material made of cemented carbide with a joint layer being interposed. The tool made of the cBN sintered body according to the present invention having such a construction can particularly effectively be used in machining of an iron-based sintered alloy, a difficult-to-machine cast iron, hardened steel, or the like, and in addition it can suitably be used also in various types of working of general metals other than the former. Here, the "tool working point" refers to a portion of a surface of the tool made of the cBN sintered body which comes in contact with a workpiece. It is noted that the tool shank portion and the vibration-isolating heat-resistant plate will be described later.

In using the tool made of the cBN sintered body according to the present invention in an application of cutting, for example, it can extremely usefully be employed as a drill, an end mill, a coated cutting insert for milling or turning, a metal saw, a gear cutting tool, a reamer, a tap, or a tip for crankshaft pin milling, a cutter for cutting a glass substrate, an optical fiber cutter, and the like.

On the other hand, in using the tool made of the cBN sintered body according to the present invention in an application of plastic working, it can extremely usefully be employed as a die for punch pressing, a die for dicing, a tool for friction welding and friction stir joint, or the like. Then, in plastic working, for example, the tool made of the cBN sintered body is used for forming an engine component, an HDD (hard disk drive), an HDD head, a capstan, a wafer chuck, a semiconductor transportation arm, components in an automobile drive system, or a zoom lens sealing ring for a camera.

<Cubic Boron Nitride Sintered Body>

The cBN sintered body according to the present invention preferably contains a heat insulating phase and a binder phase in addition to cubic boron nitride. By arranging a component of the heat insulating phase in cubic boron nitride high in thermal conductivity, a heat conduction property of the cBN sintered body can be lowered and Equation (I) and any one of Equation (II) and Equation (III) below can be satisfied.

Namely, $$20 \leq X \leq 98 \tag{I}$$

$$Y \leq 0.6 \times X + 3 \text{ (where } 20 \leq X < 88) \tag{II}$$

$$Y \leq 5.8 \times X - 455 \text{ (where } 88 \leq X \leq 98) \tag{III}$$

where a ratio of cubic boron nitride contained in the cubic boron nitride sintered body is denoted as X volume % and thermal conductivity of the cubic boron nitride sintered body is denoted as Y (W/m·K).

When such a tool made of the cBN sintered body which includes the cBN sintered body is used for cutting or plastic working, friction heat and shear heat generated during working conducts to a workpiece rather than to the tool made of the cBN sintered body. The workpiece is thus likely to soften, load imposed on the cutting edge of the tool made of the cBN sintered body can be lowered, and hence wear and chipping of the tool made of the cBN sintered body can be less likely.

As a ratio (X) of cBN contained in the cBN sintered body is increased, an upper limit value of thermal conductivity (Y) of the cBN sintered body increases. Then, a factor X in Equations (II) and (III) above is a positive numeric value that is experimentally determined in each case, and it indicates a rate of increase in upper limit value of thermal conductivity of the cBN sintered body as the ratio of cBN is increased. Namely, as the content of cBN contained in the cBN sintered body is increased, thermal conductivity of the cBN sintered body increases and a ratio of distribution of heat generated during cutting toward the cutting edge increases. Therefore, though it is disadvantageous that increase in temperature of a work material in contact with the cutting edge is suppressed and lowering in hardness of the work material is suppressed, at the same time, hardness of the cBN sintered body is advantageously enhanced. The factor of the ratio (X) of cBN is determined based on trade-off between these disadvantages and advantages.

Here, the factor X remarkably increases from 0.6 to 5.8 at a content (X) of cBN particles around 88 volume %. This is because the content of the cBN particles not less than 88 volume % causes contact among cBN particles to one another and bonding of the cBN particles to one another, so that an effect of improvement in strength of the cBN sintered body becomes noticeable.

When X is less than 20 volume %, thermal conductivity of the cBN sintered body is advantageously lowered, however, a disadvantage of lowering in hardness due to lower content of the cBN particles is rather dominant. On the other hand, when X exceeds 98 volume %, a disadvantage due to higher thermal conductivity of the cBN sintered body is dominant over an advantage of improvement in hardness owing to higher content of the cBN particles, and heat generated by cutting is less likely to flow into the work material.

In a case where relation of Y>0.6×X+3 is satisfied when X is not less than 20 volume % and less than 88 volume % or in a case where relation of Y>5.8×X−455 is satisfied when X is not less than 88 volume % and not more than 98 volume %, increase in temperature of a workpiece can be suppressed with improvement in thermal conductivity of the cBN sintered body. Therefore, lowering in hardness of the work material during cutting is insufficient with respect to hardness of the cBN sintered body at high temperature, and hence the cutting edge may be chipped or surface roughness of the work material may deteriorate.

By thus setting thermal conductivity of the cBN sintered body and the content of the cBN particles within the range above, cutting performance can be improved and surface roughness of a worked surface of a work material can be improved. The reason is estimated as follows. Owing not only to lowering in hardness due to softening of the work material during cutting but also to sufficiently high hardness of the cBN sintered body at a high temperature, shear of the work material at a tool working point can smoothly proceed, and hence generation of pits and the like is less likely in a worked surface and a good worked surface can be obtained.

In addition, a tool made of a cubic boron nitride sintered body according to the present invention includes a cubic boron nitride sintered body at least at a tool working point, and it is characterized by satisfying Equation (II')

$$Y \leq 0.5 \times X + 1 \text{ (where } 60 \leq X < 88\text{)} \quad \text{(II')}$$

where a ratio of cubic boron nitride contained in the cubic boron nitride sintered body is denoted as X volume % and thermal conductivity of the cubic boron nitride sintered body is denoted as Y (W/m·K).

The cubic boron nitride sintered body satisfying such an Equation (II') has extremely good balance between the content of the cBN particles and the content of the heat insulating phase, low thermal conductivity of the cBN sintered body, and high hardness at high temperature. As the cBN sintered body thus has low thermal conductivity, heat generated by cutting flows into the work material and hence hardness of the work material is lowered. Additionally, as the content of the cBN particles is high, hardness of the cBN sintered body is enhanced. As a synergistic effect is thus generated, a tool made of a cBN sintered body having an extremely long life can be fabricated.

Here, a minimum thickness of the cBN sintered body at the tool working point is preferably not smaller than 2 mm and more preferably not smaller than 3 mm. In a case where the minimum thickness of the cBN sintered body at the tool working point is smaller than 2 mm, when a width of wear exceeds 2 mm, working is carried out by the tool shank portion and then a life is extremely shortened. Here, the "minimum thickness" refers to a thickness of a thinnest portion of the cBN sintered body.

The tool working point preferably has surface roughness Rz not less than 1 μm and not more than 20 μm. When Rz is less than 1 μm, friction heat is less likely to be generated at the tool working point, a temperature of a work material does not sufficiently increase at the working point, and hence chipping may be more likely. On the other hand, when Rz exceeds 20 μm, a component of a workpiece tends to adhere to the cutting edge during working and surface roughness of the workpiece may degrade. From a point of view of improvement in tool life and better surface roughness of the workpiece, Rz is more preferably not less than 1.5 μm and not more than 10 μm and further preferably not less than 2 μm and not more than 5 μm. It is noted that, in the present invention, surface roughness Rz refers to 10-point average roughness defined under JIS B0601 and a measurement value obtained with the use of a surface roughness measuring instrument (SURFCOM 2800E (manufactured by Tokyo Seimitsu Co., Ltd.)) is adopted.

<Cubic Boron Nitride Sintered Body>

The present invention is characterized in that cubic boron nitride is contained in the cBN sintered body by not less than 20 volume % and not more than 98 volume %. Here, when cBN in the cBN sintered body is less than 20 volume %, wear resistance is insufficient. When cBN exceeds 98 volume %, the binder phase becomes relatively less and bonding strength lowers. In consideration of balance between wear resistance and bonding strength, a content of cBN is more preferably not less than 60 volume % and less than 88 volume %.

Here, the cBN sintered body is preferably manufactured by sintering cBN particles, source material powders of a first compound forming the heat insulating phase, and source material powders forming the binder phase. From a point of view of a strengthened effect of improvement in material strength and lowering in thermal conductivity, the cBN particles more preferably have a small average particle size and the cBN particles preferably have an average particle size not greater than 1 μm. In addition, from a point of view of not impairing toughness of the cBN sintered body, the cBN particles preferably have an average particle size not smaller than 0.1 μm. From a point of view of balance among material strength, thermal conductivity, and toughness, the cBN particles further preferably have an average particle size not smaller than 0.2 μm and not greater than 0.5 μm.

In addition, coated cBN particles in which a surface of a cBN particle is coated with a coating layer are preferably employed. Regarding the coated cBN particles, cBN particles high in thermal conductivity are less likely to come in contact with one another owing to the coating layer and hence increase in thermal conductivity of the cBN sintered body is suppressed.

The coating layer for coating the cBN particles contains one or more types of third compound composed of one or more types of element selected from the group consisting of Al, Si, Ti, Zr, Mo, Ni, and Cr and one or more types of element selected from the group consisting of N, C, O, and B, and exhibits an effect as the heat insulating phase. Here, a third compound having composition the same as the composition exemplified in connection with the first compound can be employed. Such a coating layer is preferably formed on a surface of a cBN particle with PVD sputtering, and it has an average layer thickness preferably not smaller than 5 nm and not greater than 50 nm. It is noted that an average layer thickness of the coating layer is measured in such a manner that a layer thickness of the coating layer at 10 sites is measured in an image obtained with a transmission electron microscope (TEM), a secondary electron microscope, or a reflecting electron microscope, and a value obtained by averaging measurement values is adopted.

<Binder Phase>

In the present invention, the binder phase (also referred to as a binder) contained in the cBN sintered body exhibits a function to bond the cBN particles to one another and any binder phase having conventionally known composition which has been known as a binder phase of a cBN sintered body can be adopted. For composition used for the binder phase, a compound composed of at least one type of element selected from the group consisting of Ti, W, Co, Zr, and Cr, one or more types of element selected from the group consisting of N, C, O, and B, and Al is preferred, and a compound of Al and at least one type of carbide, boride, carbonitride, oxide, and solid solution of at least one type of element selected from the group consisting of Ti, W, Co, Zr, and Cr is further preferred. Thus, in machining of an iron-based sintered alloy and cast iron, particularly good wear resistance can be obtained.

<Heat Insulating Phase>

In the present invention, as the heat insulating phase scatters in the cBN sintered body, it can lower thermal conductivity of the cBN sintered body. Therefore, heat generated during working is less likely to conduct to the tool made of the cBN sintered body but conduction thereof to a workpiece is promoted. Such a heat insulating phase is composed of a material poor in sinterability, and specifically, preferably, the heat insulating phase contains one or more types of first compound composed of one or more types of element selected from the group consisting of Al, Si, Ti, Zr, Mo, Ni, and Cr and one or more types of element selected from the group consisting of N, C, O, and B, the first compound is contained in the cBN sintered body by not less than 1 mass % and not more than 20 mass %, and it has an average particle size smaller than 100 nm. When the first compound is less than 1 mass %, an effect of lower thermal conductivity of the cubic boron nitride sintered body cannot sufficiently be obtained and conduction of heat to a workpiece is not promoted. On the other hand, when the first compound exceeds 20 mass %, sintering is insufficient and hardness of the cubic boron nitride sintered body is lowered. Meanwhile, when the first compound has an average particle size not smaller than 100 nm, an effect to lower thermal conductivity of the cubic boron nitride sintered body is low and the effect of the present invention cannot be obtained. From a point of view of lowering in thermal conductivity of the cubic boron nitride sintered body, the first compound preferably has an average particle size smaller than 50 nm.

Such a heat insulating phase preferably contains as an unsintered region, the first compound in the cBN sintered body. The "unsintered region" in the present invention refers to a region around a grain boundary and an interface where a reactant in a form of particles or fine layers caused by sintering, that is formed at an interface between the heat insulating phase and the cBN particles, does not exist, and to a region including particles in contact with that region. Such an unsintered region is included preferably by not less than 0.01 volume % and not more than 3 volume % with respect to the cBN sintered body. When the unsintered region is less than 0.01 volume %, an effect as the heat insulating phase cannot sufficiently be obtained, which is not preferred. When the unsintered region exceeds 3 volume %, strength of the cBN sintered body lowers, which is not preferred.

Though a detailed mechanism for the first compound to serve as an unsintered region has not been clarified, it is possibly considered as follows. When cBN particles, source material powders of the first compound, and source material powders forming the binder phase are mixed and sintered at an ultra-high pressure, an average particle size of the source material powders of the first compound is smaller than an average particle size of the source material powders forming the binder phase. Namely, it is estimated that a pressure on the source material powders of the first compound having a small average particle size is not sufficiently transmitted and the unsintered region in a form of fine layers is formed at the interface between the heat insulating phase, and the binder phase and the cBN particles around the same.

It is noted in the present invention that an unsintered region can be confirmed as a region occupied by particles in contact with the grain boundary where a region in which both elements of the heat insulating phase and the cBN component are simultaneously detected does not essentially exist, by using a TEM attached with an energy dispersive X-ray spectroscopy (EDX) apparatus, an Auger electron microscope, or a secondary electron microscope. In addition, volume % of an unsintered region occupied in the cBN sintered body is calculated based on a ratio of an area occupied by the unsintered region to an area of a cut surface when the cBN sintered body is cut across one plane.

The first compound above is preferably a compound in which a solid solution of any one or both of oxygen and boron is present preferably by not less than 0.1 mass % and not more than 10 mass %, more preferably by not less than 0.2 mass % and not more than 7 mass %, and further preferably by not less than 1 mass % and not more than 3 mass % with respect to a nitride, a carbide, and a carbonitride of one or more types of element selected from the group consisting of Al, Si, Ti, Zr, Mo, Ni, and Cr. By containing oxygen and boron at such a ratio, an unsintered region having an effect as the heat insulating phase is likely to be formed in the cBN sintered body, and hence a heat insulating property of the tool made of the cBN sintered body can be enhanced without impairing chipping resistance. In particular in a case where the first compound contains boron, a reactant in a form of particles or fine layers caused by sintering that is formed at an interface between the heat insulating phase and the cBN particles refers to a region around a grain boundary and an interface where boron is detected at concentration higher than the first compound.

Preferably, the cBN sintered body according to the present invention contains one or more types of second compound composed of W and/or Re and one or more types of element selected from the group consisting of N, C, O, and B, in addition to the component of the first compound above, and the second compound is contained in the cubic boron nitride sintered body by not less than 0.1 mass % and not more than 2 mass %. Here, the second compound is a compound discontinuously arranged in the structure of the cBN sintered body. For example, ammonium paratungstate $(5(NH_4)_2O.12WO_3.5H_2O)$ can be exemplified as a source material containing W, and ammonium perrhenate $(NH_4ReO_4)$ or the like can be exemplified as a material containing Re.

By mixing source material powders of the second compound (that is, for example, powders composed of $5(NH_4)_2O.12WO_3.5H_2O$ or powders composed of $NH_4ReO_4$), the source material powders forming the binder phase, and the cBN particles in addition to the source material powders of the first compound above and then subjecting the mixture to ultra-high pressure sintering, $NH_4$ and/or $H_2O$ contained in the source material powders of the second compound function(s) as a catalyst in such ultra-high pressure sintering. Then, the function of this catalyst can bring about direct bond among the cBN particles and hence strength of the cBN sintered body can be enhanced.

Further, by sintering the cBN particles together with the source material powders of such a second compound at an ultra-high pressure, W, Re, or an alloy of W and Re, and an oxide thereof excellent in hardness at high temperature and toughness are discontinuously arranged in the structure of the cBN sintered body. Thermal conductivity of the cBN sintered body can consequently be lowered. Therefore, as such a second compound is contained in the cBN sintered body, chipping resistance can be improved without lowering in wear resistance and heat resistance of the tool made of the cBN sintered body.

<Tool Shank Portion>

In the present invention, as the tool shank portion to which the cBN sintered body is fixed, any conventionally known tool shank portion which has been known as a tool shank portion of this type can be adopted, and it is not particularly limited. For example, a tool shank portion made of cemented carbide or stainless steel can suitably be used as such a tool shank portion.

Here, the cBN sintered body above and the tool shank portion are preferably fixed to each other by screwing and/or self-gripping. By fixing the cBN sintered body with such a method, when the tool made of the cBN sintered body has worn and its function has been impaired, the worn cBN sintered body alone can be replaced. Thus, the tool shank portion can repeatedly be used without replacing the same.

<Vibration-Isolating Heat-Resistant Plate>

In the present invention, a vibration-isolating heat-resistant plate is preferably interposed at a portion where the cBN sintered body and the tool shank portion are fixed to each other. By interposing the vibration-isolating heat-resistant plate, propagation of vibration caused in the cBN sintered body during working to the tool shank portion can be suppressed. Namely, by providing the vibration-isolating heat-resistant plate, load caused by vibration on the tool shank portion during working can be lessened.

Preferably, the vibration-isolating heat-resistant plate has thermal conductivity not higher than 40 W/m·K. As the vibration-isolating heat-resistant plate exhibits thermal conductivity not higher than 40 W/m·K, friction heat generated during working is less likely to conduct to the tool shank portion but it can conduct to a workpiece (including, for example, a work material). Softening of the workpiece can thus be promoted and hence chipping of the tool made of the cBN sintered body can be less likely. Such a vibration-isolating heat-resistant plate has thermal conductivity more preferably not higher than 20 W/m·K and further preferably not higher than 5 W/m·K. In addition, by using a vibration-isolating heat-resistant plate made of an oxide, thermal conductivity can further be lowered.

<Method of Manufacturing cBN Sintered Body>

The cBN sintered body employed in the present invention can be obtained by introducing cBN particles, source material powders forming the heat insulating phase, and source material powders forming the binder phase in an ultra-high pressure apparatus and then subjecting these powders to ultra-high pressure sintering. By thus including the source material powders forming the heat insulating phase and then carrying out ultra-high pressure sintering, thermal conductivity of the cBN sintered body can be lowered. Here, as a condition for ultra-high pressure sintering, a pressure during ultra-high pressure sintering is preferably low, and more specifically, the pressure is preferably not lower than 2 GPa and not higher than 7 GPa. A temperature during ultra-high pressure sintering is preferably not lower than 1100° C. and not higher than 1800° C. and a time period required for ultra-high pressure sintering treatment is preferably not shorter than 5 minutes and not longer than 30 minutes.

Further, low-pressure sintering may be carried out as a sintering method other than ultra-high pressure sintering above. Then, sintering of source material powders forming the heat insulating phase is less likely to proceed completely, unsintered regions can intentionally be scattered as a part of the heat insulating phase, and an effect to prevent heat conduction can be obtained. Here, as low-pressure sintering, for example, a hot pressing method or a spark plasma sintering method can be applied.

EXAMPLES

Though the present invention will be described further in detail with reference to examples, the present invention is not limited thereto.

Example 1

A tool made of a cBN sintered body was fabricated as below. Initially, WC powders having an average particle size of 0.8 μm, Co powders having an average particle size of 0.9 μm, and Al powders having an average particle size of 2 μm were mixed at a mass ratio of WC:Co:Al=35:55:10. Then, a compound subjected to heat treatment under vacuum at 1100° C. for 40 minutes was crushed with a ball of φ 3 mm made of cemented carbide, to thereby obtain source material powders forming the binder phase.

Then, as a component for the first compound forming the heat insulating phase, a mixture of Si powders having an average particle size of 0.7 μm and Zr powders having an average particle size of 0.6 μm was subjected to heat treatment in a nitrogen atmosphere at 1000° C. for 30 minutes to thereby fabricate a compound. After the compound was coarsely crushed, a medium having a diameter of φ 0.5 mm and made of zirconia was employed, and the medium and the compound were finely crushed in an ethanol solvent at a flow rate of 0.2 L/min. The medium used for crushing was then removed and the source material powders of the first compound (having an average particle size of 35 nm) forming the heat insulating phase were prepared.

In addition, coated cBN particles were prepared by coating cBN particles having an average particle size of 0.5 μm with a coating layer containing Ti to an average layer thickness of 40 nm with PVD sputtering. Though the description will be given later, regarding composition of the coating layer, a compound was estimated from a state of layering of various elements found by EDX.

Then, the source material powders forming the binder phase, the source material powders of the first compound forming the heat insulating phase, and the coated cBN particles obtained as above were blended, mixed, and dried such that a ratio of cBN after sintering attained to 75 volume %. It is noted that the source material powders of the first compound were blended by 10 mass % of the source material powders forming the binder phase. Further, these powders were layered on a support plate made of cemented carbide and loaded into a capsule made of Mo. Then, the powders were sintered in an ultra-high pressure apparatus at a pressure of 6.5 GPa at a temperature of 1350° C. for 30 minutes, to thereby obtain the cBN sintered body having composition and thermal conductivity shown in Table 1 below. Though the description will be given later, composition of the compound forming the binder phase was confirmed by using X-ray diffraction and shown in the field of "binder phase" in Table 1.

The cBN sintered body obtained as above was cut in a prescribed shape and fixed to a tool shank portion with a vibration-isolating heat-resistant plate being interposed, to thereby fabricate a tool made of a cBN sintered body. The tool made of the cBN sintered body thus fabricated was ground to a prescribed tool shape. Here, a tool shank portion made of cemented carbide was employed as the tool shank portion, and a vibration-isolating heat-resistant plate composed of an oxide of Zr, having a thickness not smaller than 1 mm, and having thermal conductivity of 3 W/m·K was employed.

Surface roughness Rz at the tool working point of the tool made of the cBN sintered body thus fabricated was measured with a surface roughness measuring instrument (SURFCOM 2800E (manufactured by Tokyo Seimitsu Co., Ltd.)). Rz at the tool working point of the tool made of the cBN sintered body was 2.5 μm.

Examples 2 to 3

Tools made of cBN sintered bodies according to Examples 2 to 3 respectively were fabricated with the method the same as in Example 1 except that presence/absence and composition of a coating layer as well as composition of the heat insulating phase were different as in Table 1 from the tool made of the cBN sintered body according to Example 1. For example, Example 2 was the same as Example 1 except that, as a component forming the heat insulating phase, Mo powders having an average particle size of 0.85 μm and Ni powders having an average particle size of 0.7 μm were used as the source material powders of the first compound and composition of the coating layer for coating the cBN particle was TiAl.

In addition, in Example 3, as a component forming the heat insulating phase, Mo powders having an average particle size of 0.75 μm and Cr powders having an average particle size of 0.9 μm were used as the source material powders of the first compound and ammonium paratungstate ($5(NH_4)_2O \cdot 12WO_3 \cdot 5H_2O$) powders having an average particle size of 0.6 μm and ammonium perrhenate ($NH_4ReO_4$) powders having an average particle size of 0.8 μm were used as the source material powders for the second compound. Further, cBN particles not coated with a coating layer as in Example 1 were used.

Examples 4 to 6

Tools made of cBN sintered bodies according to Examples 4 to 6 respectively were fabricated with the method the same as in Example 1 except that a ratio of cBN was different as in Table 1 from the tool made of the cBN sintered body according to Example 1.

Example 7

A tool made of a cBN sintered body according to the present Example was fabricated with the method the same as in Example 1 except that cBN source material powders not having a coating layer were used, a ratio of cBN was set to 98 volume %, and the first compound in a powder amount of 50 mass % of powders forming the binder phase was employed, as compared with the tool made of the cBN sintered body according to Example 1.

Example 8

A tool made of a cBN sintered body was fabricated as below. It is noted that tools made of cBN sintered bodies according to Examples 8 to 13 are each a tool composed only of a cBN sintered body. Initially, a compound obtained by mixing TiC powders having an average particle size of 1.2 μm and Al powders having an average particle size of 3 μm at a mass ratio of TiC:Al=90:10 and subjecting the compound to heat treatment under vacuum at 1200° C. for 30 minutes was crushed with a ball of made of cemented carbide with a diameter of 3 mm, to thereby obtain source material powders forming the binder phase.

Then, as a component for the first compound forming the heat insulating phase, a mixture of Si powders having an average particle size of 0.7 μm and Ti powders having an average particle size of 0.6 μm was subjected to heat treatment in a nitrogen atmosphere at 1000° C. for 30 minutes to thereby fabricate a compound. After the compound was coarsely crushed, a medium having a diameter of 0.3 mm and made of silicon nitride was employed, and the medium and the compound were finely crushed in an ethanol solvent at a flow rate of 0.2 L/min. The medium used for crushing was then removed and the source material powders of the first compound having an average particle size of 30 nm for forming the heat insulating phase were prepared.

In addition, coated cBN particles were prepared by coating cBN particles having an average particle size of 0.3 μm with a coating layer containing TiAl to an average layer thickness of 30 nm with PVD sputtering.

Then, the source material powders forming the binder phase, the source material powders of the first compound forming the heat insulating phase, and the coated cBN powders obtained as above were blended, mixed, and dried such that a ratio of cBN after sintering attained to 50 volume %. Here, the first compound was blended by 7 mass % of the source material powders forming the binder phase. Further, these powders were layered on a support plate made of cemented carbide and loaded into a capsule made of Mo. Thereafter, the powders were sintered in an ultra-high pressure apparatus at a pressure of 5.8 GPa at a temperature of 1250° C. for 30 minutes, to thereby obtain the cBN sintered body having composition and thermal conductivity shown in Table 1 below.

Example 9

A tool made of a cBN sintered body according to the present Example was fabricated with the method the same as in Example 8 except that a ratio of cBN was different as in Table 1 from the tool made of the cBN sintered body according to Example 8.

Example 10

A tool made of a cBN sintered body according to the present Example was fabricated with the method the same as in Example 8 except that cBN source material powders not having a coating layer were used, a ratio of cBN was set to 75 volume %, and a temperature during sintering was set to 1450° C., as compared with the tool made of the cBN sintered body according to Example 8.

Example 11

A tool made of a cBN sintered body according to the present Example was fabricated with the method the same as in Example 10 except that a pressure during sintering was set to 2.8 GPa as compared with the tool made of the cBN sintered body according to Example 10.

The cBN sintered body thus obtained was cut across one plane, and the cross-section was observed and analyzed at ×10000 by using a TEM. Consequently, it was confirmed that 0.4% of the cross-sectional area of the cross-section was unsintered. Thus, it was clarified that the cBN sintered body included an unsintered region by 0.4 volume %.

Example 12

A tool made of a cBN sintered body was fabricated by using a spark plasma sintering (SPS) apparatus instead of an ultra-high pressure sintering apparatus, as compared with the tool made of the cBN sintered body according to Example 10. Specifically, by sintering the cBN powders, the source material powders forming the binder phase, and the source material powders of the first compound forming the heat insulating phase with a temperature in the SPS apparatus being set to 1450° C. and a pressure during sintering being adjusted to 0.06 GPa, the cBN sintered body was obtained. A method of fabricating a cBN sintered body with the use of the SPS apparatus will specifically be described. A mixture of cBN powders, source material powders forming the binder phase, and source material powders of the first compound forming the heat insulating phase was loaded into a mold for sintering made of graphite, a pressure was increased to 0.06 GPa, a temperature in the apparatus was set to 1450° C. under a vacuum heating condition, and spark plasma sintering was carried out for 30 minutes or shorter (see, for example, paragraph [0014] of Japanese Patent Laying-Open No. 2008-121046).

The cBN sintered body thus obtained was cut across one plane, and the cross-section was observed at ×10000 by using an SEM. Consequently, it was confirmed that 1.3% of the cross-sectional area of the cross-section was unsintered. Thus, it was clarified that the cBN sintered body included an unsintered region by 1.3 volume %.

In addition, it was confirmed that a partial region was hexagonal, as a result of X-ray diffraction of the cBN sintered body obtained in the present Example. It was thus clarified that the cubic boron nitride sintered body according to the present Example partially included hexagonal boron nitride (hBN). Such generation of hBN is estimated to probably have resulted from inverse transformation from cBN to hBN due to a low sintering pressure during sintering.

Example 13

A tool made of a cBN sintered body was fabricated by using a hot pressing apparatus instead of an ultra-high pressure sintering apparatus, as compared with the tool made of the cBN sintered body according to Example 10. Specifically, by sintering the cBN powders, the source material powders forming the binder phase, and the source material powders of the first compound forming the heat insulating phase with a temperature in the hot pressing apparatus being set to 1450° C. and a pressure during sintering being adjusted to 0.02 GPa, the cBN sintered body was obtained.

The cBN sintered body thus obtained was cut across one plane, and the cross-section was observed and analyzed at ×10000 by using a TEM. Consequently, it was confirmed that 3.5% of the cross-sectional area of the cross-section was unsintered. Thus, it was clarified that the cBN sintered body included an unsintered region by 3.5 volume %.

In addition, it was confirmed that hBN was partially included as in Example 12, as a result of X-ray diffraction of the cBN sintered body obtained in the present Example.

The tool made of the cBN sintered body according to each Example thus fabricated is a tool made of a cubic boron nitride sintered body which includes a cubic boron nitride sintered body at least at a tool working point, and the tool satisfies Equation (I) and any one of Equation (II) and Equation (III)

$$20 \leq X \leq 98 \quad (I)$$

$$Y \leq 0.6 \times X + 3 \text{ (where } 20 \leq X < 88 \text{)} \quad (II)$$

$$Y \leq 5.8 \times X - 455 \text{ (where } 88 \leq X \leq 98 \text{)} \quad (III)$$

where a ratio of cubic boron nitride contained in the cubic boron nitride sintered body is denoted as X volume % and thermal conductivity of the cubic boron nitride sintered body is denoted as Y (W/m·K).

Comparative Examples 1 to 2

Tools made of cubic boron nitride sintered bodies according to Comparative Examples 1 to 2 respectively were fabricated with the method the same as in Example 1 except that a ratio of cBN and composition in the binder phase were different as in Table 1 from the tool made of the cubic boron nitride sintered body according to Example 1 and that the heat insulating phase was not included. It is noted that an average particle size of a component forming the binder phase in the cubic boron nitride sintered body thus fabricated was measured and the average particle size was 100 nm or greater in each case.

Comparative Example 3

A commercially available cBN sintered body (a trade name: MB8025 (manufactured by Mitsubishi Materials Corporation)) was used.

Comparative Example 4

A commercially available cBN sintered body (a trade name: BX480 (manufactured by Tungaloy Corporation)) was used.

TABLE 1

| | Binder Phase | Heat Insulating Phase (First Compound, Second Compound) | Coating Layer | Ratio of cBN X (Volume %) | $20 \leq X < 88$ $0.6 \times X + 3$ (II) | $88 \leq X \leq 98$ $5.8 \times X - 455$ (III) | $60 \leq X < 88$ $0.5 \times X + 1$ (II') | Thermal Conductivity Y (W/m·K) |
|---|---|---|---|---|---|---|---|---|
| Example 1 | WC, $W_2Co_{21}B_6$, $Co_3W_3C$, $AlB_2$ | $SiO_2$, $ZrO_2$, ZrC | $TiB_2$, $TiO_2$, TiN | 75 | 48 | — | 38.5 | 43 |
| Example 2 | WC, $W_2Co_{21}B_6$, $Co_3W_3C$, $AlB_2$ | $MoO_3$, $Mo_2C$, NiO | TiAlN, $TiB_2$, $AlB_2$ | 75 | 48 | — | 38.5 | 38 |

TABLE 1-continued

| | Binder Phase | Heat Insulating Phase (First Compound, Second Compound) | Coating Layer | Ratio of cBN X (Volume %) | $20 \leq X < 88$ $0.6 \times X + 3$ (II) | $88 \leq X \leq 98$ $5.8 \times X - 455$ (III) | $60 \leq X < 88$ $0.5 \times X + 1$ (II') | Thermal Conductivity Y (W/m·K) |
|---|---|---|---|---|---|---|---|---|
| Example 3 | WC, W$_2$Co$_{21}$B$_6$, Co$_3$W$_3$C, AlB$_2$ | MoO$_3$, Mo$_2$C, Cr$_2$O$_3$, WO$_3$, ReO$_4$ | — | 75 | 48 | — | 38.5 | 46 |
| Example 4 | WC, W$_2$Co$_{21}$B$_6$, Co$_3$W$_3$C, AlB$_2$ | SiO$_2$, ZrO$_2$, ZrC | TiB$_2$, TiO$_2$, TiN | 60 | 39 | — | 31 | 33 |
| Example 5 | WC, W$_2$Co$_{21}$B$_6$, Co$_3$W$_3$C, AlB$_2$ | SiO$_2$, ZrO$_2$, ZrC | TiB$_2$, TiO$_2$, TiN | 88 | — | 55.4 | — | 55 |
| Example 6 | WC, W$_2$Co$_{21}$B$_6$, Co$_3$W$_3$C, AlB$_2$ | SiO$_2$, ZrO$_2$, ZrC | TiB$_2$, TiO$_2$, TiN | 92 | — | 78.6 | — | 78 |
| Example 7 | WC, W$_2$Co$_{21}$B$_6$, Co$_3$W$_3$C, AlB$_2$ | SiO$_2$, ZrO$_2$, ZrC | — | 98 | — | 113.4 | — | 110 |
| Example 8 | TiC, TiB$_2$, AlB$_2$ | Si$_3$N$_4$, SiO$_2$, TiSiN, TiO$_2$ | TiAlN, TiB$_2$, AlB$_2$ | 50 | 33 | — | — | 32 |
| Example 9 | TiC, TiB$_2$, AlB$_2$ | Si$_3$N$_4$, SiO$_2$, TiSiN, TiO$_2$ | TiAlN, TiB$_2$, AlB$_2$ | 20 | 15 | — | — | 14 |
| Example 10 | TiC, TiB$_2$, AlB$_2$ | Si$_3$N$_4$, SiO$_2$, TiSiN | — | 75 | 48 | — | 38.5 | 48 |
| Example 11 | TiC, TiB$_2$, AlB$_2$ | Si$_3$N$_4$, SiO$_2$, TiSiN | — | 75 | 48 | — | 38.5 | 43 |
| Example 12 *1 | TiC, TiB$_2$, AlB$_2$ | Si$_3$N$_4$, SiO$_2$, TiSiN | — | 75 | 48 | — | 38.5 | 38.5 |
| Example 13 *2 | TiC, TiC$_2$, AlB$_2$ | Si$_3$N$_4$, SiO$_2$, TiSiN | — | 75 | 48 | — | 38.5 | 32 |
| Comparative Example 1 | TiN, TiB$_2$, AlN | — | — | 75 | 48 | — | 38.5 | 70 |
| Comparative Example 2 | WC, CoWB, AlB$_2$ | — | — | 88 | — | 55.4 | — | 95 |
| Comparative Example 3 *3 | TiN, TiB$_2$, AlN | — | — | 60 | 39 | — | 31 | 60 |
| Comparative Example 4 *3 | WC, W$_2$Co$_{21}$B$_6$, Co$_3$W$_3$C, AlB$_2$ | — | — | 95 *4 | — | 96 | — | 120 |

*1 The cBN sintered body was fabricated with the use of the spark plasma sintering apparatus.
*2 The cBN sintered body was fabricated with the use of the hot pressing apparatus.
*3 A commercially available cBN sintered body was used.
*4 A catalogue value is shown.

Here, "ratio of cBN" in Table 1 shows a ratio (X) of cBN contained in a cBN sintered body and it was calculated as follows. Initially, the cBN sintered body fabricated in each Example and each Comparative Example was mirror-polished (a thickness to be polished being smaller than 50 μm), and a cBN sintered body structure in an arbitrary region was photographed at ×10000 with an electron microscope. Then, a black region, a gray region, and a white region were observed. With an attached EDX, it was confirmed that the black region represented cBN particles, and the gray region and the white region represented the binder phase. Further, it was also confirmed that the gray region represented a Co compound, a Ti compound, and an Al compound, and the white region represented a W compound.

Then, the photograph at ×10000 taken as above was subjected to binarization processing by using image processing software and a total area of the regions occupied by the cBN particles (the black regions) in the photograph was calculated. A percentage of the ratio of the black regions occupied in the cBN sintered body in the photograph is shown in Table 1 as expressed in volume %.

In addition, "thermal conductivity" in Table 1 was calculated based on thermal diffusivity of the cBN sintered body obtained by measurement with a laser flash method and on specific heat and density of the cBN sintered body calculated with a different method.

With regard to the binder phase, a compound can be identified through X-ray diffraction above, however, a content of a first compound, a second compound, and a coating layer forming the heat insulating phase is small and therefore a clear intensity peak could not be obtained in X-ray diffraction. Therefore, an arbitrary region in a mirror-polished surface of a cBN sintered body was photographed at ×50000 with an electron microscope and a compound was estimated from a state of layering of various elements found by the attached EDX. Results in EDX composition analysis thus carried out are shown in the fields of "heat insulating phase" and "coating layer" in Table 1.

The cubic boron nitride sintered body according to each Example and each Comparative Example thus obtained was used to fabricate a tool made of the cBN sintered body having the following tool shape. Then, the tool made of the cBN sintered body was subjected to cutting tests 1 and 2 and plasticity tests 1 and 2. Tables 2 to 5 show the results.

<Cutting Test 1>

The tools made of the cBN sintered bodies, of a tool model number SNMA120430, were fabricated in accordance with Examples 1 to 7 and Comparative Examples 1 to 4 and they were subjected to a cutting test under the following conditions.

Work material: Working of outer diameter of Ni-based ultra-heat-resistant alloy Inconel 718

Hardness of work material: Hv 430

Cutting condition: Cutting speed Vc=150 m/min.

Amount of feed f=0.13 mm/rev.

Cutting depth $a_p$=0.2 mm

Coolant Emulsion of 20-fold dilution

TABLE 2

| | Distance of Cutting Until Tool Life Was Reached (km) | Form of Damage |
|---|---|---|
| Example 1 | 1.8 | Normal Wear |
| Example 2 | 2.5 | Normal Wear |
| Example 3 | 1.7 | Boundary Chipped |
| Example 4 | 2.0 | Boundary Chipped |
| Example 5 | 1.7 | Normal Wear |
| Example 6 | 1.6 | Normal Wear |
| Example 7 | 1.5 | Normal Wear |
| Comparative Example 1 | 0.4 | Boundary Chipped |
| Comparative Example 2 | 0.6 | Boundary Chipped |
| Comparative Example 3 | 0.2 | Boundary Chipped |
| Comparative Example 4 | 0.1 | Boundary Chipped |

The field of "distance of cutting until tool life was reached" in Table 2 represents a distance of cutting (km) at the time point when a wear width of the cBN sintered body exceeded 0.3 mm in a case where no chipping was caused before the wear width exceeds 0.3 mm, and it represents a distance of cutting (km) until chipping was caused in a case where chipping was caused before the wear width exceeds 0.3 mm, with the cutting test being stopped at that time point. It is noted that a longer distance of cutting indicates a longer tool life.

In addition, "form of damage" in Table 2 shows "normal wear" when a wear width of the cBN sintered body after the cutting test exceeded 0.3 mm and shows "boundary chipped" in a case where chipping was caused before that.

As can clearly be seen in Table 2, it is evident that the tools made of the cubic boron nitride sintered bodies according to the present invention in Examples 1 to 7 have a longer tool life than the tools made of the cubic boron nitride sintered bodies in Comparative Examples 1 to 4 respectively.

Among Examples 1 to 7, the tool made of the cubic boron nitride sintered body according to Example 2 is considered to have the longest life because X is not smaller than 60 and smaller than 88 and relation of $Y \leq 0.5 \times X + 1$ is satisfied.

In addition, the tool made of the cubic boron nitride sintered body according to each Comparative Example satisfies relation of $Y > 0.6 \times X + 3$ when relation of $20 \leq X < 88$ is satisfied or satisfies relation of $Y > 5.8 \times X - 455$ when relation of $88 \leq X \leq 98$ is satisfied. Therefore, it is estimated that the work material could not sufficiently be softened because of hardness at high temperature of the cBN sintered body, which led to boundary chipping in an early stage.

<Cutting Test 2>

In Examples 8 to 13 and Comparative Examples 1 and 3, the tools made of the cBN sintered bodies, of a tool model number CNGA120408, were fabricated and subjected to a cutting test under the following conditions.

Work material: 0.8C-2.0Cu-remainder Fe (JPMA notation: SMF4040)
Work material hardness: 78 HRB
Cutting condition: Cutting speed Vc=100 m/min.
Amount of feed f=0.08 mm/rev.
Cutting depth $a_p$=0.2 mm
Cutting fluid Used

TABLE 3

| | Distance of Cutting Until Tool Life Was Reached (km) | Form of Damage |
|---|---|---|
| Example 8 | 11.9 | Normal Wear |
| Example 9 | 8.5 | Normal Wear |
| Example 10 | 10.2 | Normal Wear |
| Example 11 | 10.9 | Normal Wear |
| Example 12 | 12.7 | Normal Wear |

TABLE 3-continued

| | Distance of Cutting Until Tool Life Was Reached (km) | Form of Damage |
|---|---|---|
| Example 13 | 13.5 | Small Chipping |
| Comparative Example 1 | 0.1 | Normal Wear |
| Comparative Example 3 | 0.1 | Normal Wear |

"Distance of cutting until tool life was reached" in Table 3 represents a distance of cutting (km) at the time point when surface roughness Rz of the work material exceeded 3.2 µm. It is noted that a longer distance of cutting indicates a longer tool life. In addition, "form of damage" in Table 3 shows "small chipping" when chipping to such an extent as visually observed in a surface of the cBN sintered body after the cutting test was caused. It is noted that other forms of damage were determined based on the criteria as in cutting test 1.

As can clearly be seen in Table 3, it is evident that the tools made of the cubic boron nitride sintered bodies according to the present invention in Examples 8 to 13 have longer tool life than the tools made of the cubic boron nitride sintered bodies according to Comparative Examples 1 and 3.

The reason why the tool life of the tools made of the cubic boron nitride sintered bodies according to Comparative Examples 1 and 3 was short may be because relation of $Y \leq 0.6 \times X + 3$ was not satisfied, and hence a relatively large amount of heat generated by working flowed into the tool, softening of a work material was consequently not promoted sufficiently, shear of the work material at the tool working point did not smoothly proceed, pits were caused in a worked surface from an initial stage of working, and surface roughness of the worked surface became poor.

<Plasticity Test 1: Punch Pressing>

In Examples 1 to 3 and Comparative Examples 1 to 2, the tools made of the cBN sintered bodies having a cylindrical tool shape with a diameter of 10 mm were fabricated and subjected to a plasticity test under the following conditions.

Workpiece: SUS304
Hardness of workpiece: Hv 170
Thickness of workpiece: 2 mm
Plasticity Condition: Punch-pressing load of 2.3 GPa

TABLE 4

| | The Number of Times of Punching (Times) |
|---|---|
| Example 1 | 28500 |
| Example 2 | 32000 |
| Example 3 | 24000 |
| Comparative Example 1 | 4000 |
| Comparative Example 2 | 5000 |

"The number of times of punching" in Table 4 shows the number of times of punching the workpiece before creation of burr in a punched hole. It is noted that the greater number of times of punching indicates improvement in relative hardness of a tool made of a cubic boron nitride sintered body to a work material and a longer tool life.

As can clearly be seen in Table 4, it is evident that the tools made of the cubic boron nitride sintered bodies according to the present invention in Examples 1 to 3 have a longer tool life than the tools made of the cubic boron nitride sintered bodies in Comparative Examples 1 to 2. Thus, it was confirmed that a life of a tool made of a cubic boron nitride sintered body was improved.

<Plasticity Test 2: Friction Compression Joint>

In Examples 1 to 3 and Comparative Examples 1 to 2, a special tool in which a vibration-isolating heat-resistant plate having a thickness of 2 mm and made of zirconia was brazed to a bottom surface of the tool made of the cBN sintered body where a protrusion in an M4 left-hand screw shape having a screw height of 3 mm was formed in a central portion of a column having a diameter of 12.7 mm was fabricated and subjected to a plasticity test under the following conditions.

Material to be joined: Two-layered high-tensile steel
Tensile strength of material to be joined: 600 MPa
Thickness of material to be joined: 1 mm
Joint conditions: The number of revolutions of 2800 rpm
Pressurizing force of 11000 N

TABLE 5

|  | The Number of Times of Joint (Times) |
|---|---|
| Example 1 | 12000 |
| Example 2 | 15000 |
| Example 3 | 9000 |
| Comparative Example 1 | 250 |
| Comparative Example 2 | 150 |

"The number of times of joint" in Table 5 shows the number of times of joining the material to be joined before a screw portion of the tool made of the cBN sintered body was chipped. It is noted that the greater number of times of joint indicates a longer tool life.

As can clearly be seen in Table 5, it is evident that the tools made of the cubic boron nitride sintered bodies according to the present invention in Examples 1 to 3 have a longer tool life than the tools made of the cubic boron nitride sintered bodies in Comparative Examples 1 to 2.

Though the embodiments and the examples of the present invention have been described as above, combination of the features in the embodiments and the examples described above as appropriate is also originally intended.

It should be understood that the embodiments and the example disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A tool made of a cubic boron nitride sintered body, comprising a cubic boron nitride sintered body at least at a tool working point,
said tool satisfying an Equation (I) and any one of an Equation (II) and an Equation (III)×

$20 \leq X \leq 98$ (I)

$Y \leq 0.6 \times X + 3$ (where $20 \leq X < 88$) (II)

$Y \leq 5.8 \times X - 455$ (where $88 \leq X \leq 98$) (III)

where a ratio of the volume of cubic boron nitride contained in said cubic boron nitride sintered body to that of said cubic boron nitride sintered body is denoted as X volume % and thermal conductivity of said cubic boron nitride sintered body is denoted as Y (W/m·K), said cubic boron nitride sintered body containing a binder phase in addition to said cubic boron nitride,
the composition used for said binder phase being a compound of both Al and at least one type of carbide, boride, carbonitride, oxide, and solid solution including at least Co,
said cubic boron nitride sintered body contains a heat insulating phase in addition to said cubic boron nitride and said binder phase,
said heat insulating phase contains one or more types of first compound composed of one or more types of element selected from the group consisting of Al, Si, Ti, Zr, Mo, Ni, and Cr and one or more types of element selected from the group consisting of N, C, O, and B, and
said first compound is contained in said cubic boron nitride sintered body by not less than 1 mass % and not more than 20 mass % and has an average particle size smaller than 100 nm.

2. The tool made of a cubic boron nitride sintered body according to claim 1, wherein
said tool satisfying an Equation (II')

$Y \leq 0.5 \times X + 1$ (where $60 \leq X < 88$) (II')

3. The tool made of a cubic boron nitride sintered body according to claim 1, wherein
said first compound has an average particle size smaller than 50 nm.

4. The tool made of a cubic boron nitride sintered body according to claim 1, wherein
said heat insulating phase contains as its part, an unsintered region by not less than 0.01 volume % and not more than 3 volume %.

5. The tool made of a cubic boron nitride sintered body according to claim 1, wherein
said first compound is a compound in which a solid solution of any one or both of oxygen and boron is present by not less than 0.1 mass % and not more than 10 mass % with respect to a nitride, a carbide, and a carbonitride of one or more types of element selected from the group consisting of Al, Si, Ti, Zr, Mo, Ni, and Cr.

6. The tool made of a cubic boron nitride sintered body according to claim 1, wherein
said heat insulating phase contains one or more types of second compound composed of at least one of W and Re and one or more types of element selected from the group consisting of N, C, O, and B, in addition to said first compound, and
said second compound is contained in said cubic boron nitride sintered body by not less than 0.1 mass % and not more than 2 mass %.

7. The tool made of a cubic boron nitride sintered body according to claim 1, wherein
said cubic boron nitride is composed of cubic boron nitride particles having an average particle size not greater than 1 μm.

8. The tool made of a cubic boron nitride sintered body according to claim 1, wherein
said cubic boron nitride particle has a surface coated with a coating layer, and
said coating layer has an average layer thickness not smaller than 5 nm and not greater than 50 nm.

* * * * *